United States Patent
Maas

(10) Patent No.: US 10,286,639 B2
(45) Date of Patent: May 14, 2019

(54) APPARATUS AND METHOD FOR FORMING A LAMINATED COMPONENT WITH A FOLDED-BACK RIM

(71) Applicant: OLBRICH GmbH, Bocholt (DE)

(72) Inventor: Peter Maas, Bocholt (DE)

(73) Assignee: OLBRICH GmbH, Bocholt (DE)

(*) Notice: Subject to any disclaimer, the term of this patent is extended or adjusted under 35 U.S.C. 154(b) by 49 days.

(21) Appl. No.: 15/609,520

(22) Filed: May 31, 2017

(65) Prior Publication Data
US 2018/0250923 A1    Sep. 6, 2018

(30) Foreign Application Priority Data
Mar. 6, 2017   (DE) .................. 10 2017 104 638

(51) Int. Cl.
*B29C 53/04*   (2006.01)
*B60R 13/02*   (2006.01)
(Continued)

(52) U.S. Cl.
CPC .............. *B32B 37/10* (2013.01); *B29C 53/04* (2013.01); *B32B 37/06* (2013.01); *B32B 38/18* (2013.01); *B60R 13/02* (2013.01); *B32B 2605/003* (2013.01); *B32B 2607/00* (2013.01); *Y10T 156/1034* (2015.01)

(58) Field of Classification Search
None
See application file for complete search history.

(56) References Cited

U.S. PATENT DOCUMENTS 4,839,126 A * 6/1989 Griesdorn ............... B29C 53/04
156/227
4,923,539 A   5/1990 Spengler et al.
(Continued)

FOREIGN PATENT DOCUMENTS

DE    94 07 177    10/1994
DE    44 13 834    2/1995
(Continued)

OTHER PUBLICATIONS

German Examiner Bernd Kayser, German Office Action in German Patent Application No. 10 2017 104 638.0, dated Nov. 9, 2017, 5 pages, with partial English translation, 3 pages.

*Primary Examiner* — Barbara J Musser
(74) *Attorney, Agent, or Firm* — W. F. Fasse

(57) ABSTRACT

An apparatus includes upper and lower pressing tools arranged on platens that move relative to one another in a stroke direction. A slider unit moves in a direction transverse to the stroke direction, coordinated with the relative motion of the platens. In a retracted position the slider unit is displaced laterally from the lower pressing tool. In an active position the slider unit protrudes laterally over an edge portion of the lower pressing tool. Pressure actuators between the lower platen and the lower pressing tool apply an increased active pressing force on the lower pressing tool toward the upper pressing tool. Through the combined motions, the pressing tools press a laminated component including a cover layer on a substrate, and the slider unit folds and presses a protruding margin of the cover layer around an edge and onto a back surface of the substrate to form a folded-back rim.

20 Claims, 2 Drawing Sheets

(51) Int. Cl.
*B32B 37/10* (2006.01)
*B32B 37/06* (2006.01)
*B32B 38/18* (2006.01)

(56) References Cited

U.S. PATENT DOCUMENTS

| | | |
|---|---|---|
| 5,076,880 A | 12/1991 | Spengler et al. |
| 5,324,384 A | 6/1994 | Spengler |
| 5,718,791 A | 2/1998 | Spengler |
| 5,925,207 A * | 7/1999 | Itoh ..................... B29C 63/04 |
| | | 156/212 |
| 6,214,157 B1 | 4/2001 | Spengler |
| 6,524,506 B2 | 2/2003 | Spengler |
| 6,524,510 B2 | 2/2003 | Spengler |
| 7,101,503 B2 | 9/2006 | Spengler et al. |
| 8,267,139 B2 * | 9/2012 | Schellhase ............ B29C 51/087 |
| | | 156/443 |
| 2011/0274921 A1 * | 11/2011 | Li ......................... B29C 53/36 |
| | | 428/354 |

FOREIGN PATENT DOCUMENTS

| | | |
|---|---|---|
| DE | 102009008310 | 8/2010 |
| DE | 102011015818 | 10/2012 |
| EP | 2 457 706 | 5/2012 |
| WO | WO 2012/130472 | 10/2012 |

\* cited by examiner

APPARATUS AND METHOD FOR FORMING A LAMINATED COMPONENT WITH A FOLDED-BACK RIM

FIELD OF THE INVENTION

The invention relates to an apparatus for folding back a protruding margin or rim of a cover layer around an edge rim of a substrate to form a folded-back rim of a laminated component or workpiece comprising the cover layer laminated onto the substrate and folded-back and bonded around the edge rim of the substrate. The invention further relates to a method for forming a laminated component having such a folded-back rim.

PRIORITY CLAIM

This application is based on and claims the foreign priority under 35 USC 119 of German patent application DE 10 2017 104 638.0 as filed on Mar. 6, 2017. The entire disclosure of the priority application is incorporated herein by reference.

BACKGROUND INFORMATION

It is generally known in the prior art to form various laminated components or workpieces that include a cover layer laminated onto a substrate. The substrate provides the structural strength, configuration, and form-stability of the component, while the cover layer provides a visually attractive surface as well as other desired surface characteristics such as a soft-touch cushioned feeling, an impervious covering, and a good finish of the exposed or visible side of the finished installed component. Such laminated components include, for example, various trim components for interior finishing of motor vehicles, such as door panels, headliners, dashboards, column trim covers, parcel shelves, and cargo area load floors.

The substrate may be formed of one or more layers of natural and/or synthetic materials, which may be pressed to have a flat planar configuration or pressed and molded in two or three dimensions to have a contoured molded configuration. The cover layer may, for example, be a sheet of natural and/or synthetic material such as leather, vinyl, woven or non-woven fabric, carpet, etc., which is laminated onto the substrate. It has long been desired to form a finished edge of such a component, so that the edge is more visually pleasing and durable, e.g. to avoid fraying, delaminating, peeling, etc. of the cover layer at the edge.

From the prior art such as German patent DE 44 13 834 C1 and German patent laying-open publication DE 10 2009 008 310 A1, it is known to form a laminated component having a folded-back rim by folding-back a protruding margin or rim of a cover layer around an edge rim of a substrate. The prior art provides known methods and apparatuses for forming such a laminated component. For example, such a known apparatus includes a lower press platen and an upper press platen or stroke platen, which are linearly movable relative to one another in a stroke direction. An upper pressing tool or mold tool is mounted on the upper stroke platen, and a lower pressing tool, mold tool or workpiece receiver is mounted on the lower platen. The substrate and cover layer are received between the upper and lower tools.

The apparatuses and the associated methods known from the prior art have the disadvantage that they are not able to apply the required pressing force, especially in the edge region of the component, in order to produce a uniform, repeatable, durable and strong bonding or adhesion of the laminated cover layer along the edge of the substrate. As a result, it has been found that the folded-back margin or rim of the cover layer can peel or become delaminated from the substrate. In order to eliminate this problem, it is currently a typical practice to use special high-performance adhesives at least in the edge region of such a laminated component, to try to achieve a more strongly adhered and more durable fixing of the folded-back margin or rim of the cover layer on the edge rim of the substrate. However, such high performance adhesives are more expensive than the typical adhesives that are adequate for lamination of the main body field of the cover layer onto the substrate, so that the overall material costs of producing such trim components is correspondingly increased. Also, carrying out such a process and correspondingly equipping an apparatus for applying two different adhesives respectively in the body field and in the edge portion of the component significantly complicates the method and the apparatus.

SUMMARY OF THE INVENTION

In view of the above, it is an object of at least one embodiment of the invention to provide an apparatus of the general type described above, which is improved so as to form a folded-back rim of a laminated workpiece with a reliable bonding or adhesion of the rim portion of the cover layer onto and around the edge rim of the substrate, preferably even when using economical adhesive materials in the edge rim region of the workpiece. The apparatus shall preferably have a relatively simple construction, using relatively simple and economical technical measures. It is another object of at least one embodiment of the invention to provide a method by which a folded-back rim can be formed on a laminated component, with a reliable and durable bonding or adhesion of the folded-back edge rim portion of the cover layer onto and around the edge rim of the substrate, preferably while using economical adhesive materials. These results shall also be reliably reproducible and consistent. The invention further aims to avoid or overcome the disadvantages of the prior art, and to achieve additional advantages, as apparent from the present specification. The attainment of these objects is, however, not a required limitation of the claimed invention.

The above objects can be achieved with an apparatus according to an embodiment of the invention for forming a laminated and pressed or molded workpiece having a folded-back rim, including a cover layer laminated onto a substrate, with a protruding margin or rim portion of the cover layer folded back around and adhered onto an edge rim of the substrate. The apparatus comprises a lower press platen and an upper or stroke press platen that are linearly movable relative to one another in a stroke direction between an open position and a closed position. The apparatus further comprises an upper pressing or mold tool mounted on the upper platen and a lower pressing or mold tool or workpiece receiver mounted on the lower platen. The apparatus still further comprises an edge-folding device including a slider unit that is movable in a direction transverse to, and preferably perpendicular to, the stroke direction, between a retracted position and an active position. In the active position, the slider unit protrudes and reaches over an outer edge of the workpiece receiver, and in the retracted position the slider unit is positioned laterally in front of or beside the outer edge of the workpiece receiver. Thus, in the retracted position, the slider unit particularly does not protrude or reach over the outer edge of the workpiece receiver. Thereby it can be achieved that in the retracted position the workpiece receiver is freely movable in the stroke direction sufficiently so that its mobility in the stroke direction is not blocked or constrained or limited by the slider unit. By the sliding movement of the slider unit in the sliding direction perpendicular to the stroke direction, coordinated with the pressing movement of the mold tools in the stroke direction, the slider unit serves to fold back and tightly laminate the protruding margin or rim of the cover layer around the edge rim of the substrate.

Preferably, the slider unit provides an additional pressing counter surface in the edge region of the workpiece, against which the edge region of the workpiece and correspondingly the edge portion of the cover layer are pressed, when the lower platen and the upper stroke platen have been moved toward one another into the closed position for pressing and molding the substrate and the cover layer laminated thereon.

In a particular embodiment, the lower platen is stationary, and the workpiece receiver is linearly movable, and at least a portion thereof is spring-supported, in the stroke direction relative to the lower platen. In this manner, an additional pressing force can be produced to press the workpiece (which is supported on the workpiece receiver) against the upper mold tool, when the upper and lower platens are in their closed position.

In a further preferred embodiment feature of the invention, the closed position is especially a defined closed position of the lower platen and the upper stroke platen relative to one another. This position is characterized in that a spacing distance between the lower mold tool or workpiece receiver and the upper mold tool exactly corresponds to the sum of the material thickness of the cover layer and the material thickness of the substrate, respectively as measured in the stroke direction. Thus, in the closed position of the upper and lower platens, the space between the workpiece receiver and the upper mold tool will particularly correspond to the total thickness of the laminated component or workpiece including the substrate and the cover layer. Furthermore, in the closed position of the lower platen and the upper stroke platen, the upper mold tool preferably contacts a protruding rim of the slider unit that protrudes over the outer edge of the workpiece receiver. Thereby the position of the slider unit in the stroke direction is further fixed by the position of the upper mold tool due to this mechanical stopping or contact of the upper mold tool against the protruding rim of the slider unit.

According to a further preferred feature, the apparatus additionally comprises at least one pressure actuator configured and arranged to impose a mechanical pressure or pressing force on the workpiece receiver relative to the lower platen in the stroke direction, particularly directed toward the upper mold tool. Thereby, in the closed position of the lower platen and the upper stroke platen, the pressure actuator is effective to press the workpiece receiver in the stroke direction toward the upper mold tool and thus in the direction toward the lower pressing surface of the protruding rim of the slider unit, which is protruding over the outer edge of the workpiece receiver.

Thereby, because the workpiece, especially including the protruding margin of the cover layer folded back around the edge rim of the substrate, is pressed against the lower pressing surface of the protruding rim of the slider unit, as a result a particularly high pressing force and therewith a particularly effective lamination and bonding between the cover layer and the substrate is achieved in the especially important edge region of the workpiece for ensuring the secure, reliable and durable adhesion of the cover layer onto the substrate in this edge region.

The pressure actuator can particularly be an electric motor driven pressure actuator, a hydraulic pressure actuator, or a pneumatic pressure actuator. For example, the pressure actuator can comprise a pneumatic pressure cushion such as an inflatable air bag or pressure hose. The pressure actuator preferably additionally comprises an electronic control and regulating unit that is configured and adapted to actuate and control the pressure actuator so that the workpiece on the workpiece receiver is pressed with a defined pressing force or pressure against the upper mold tool. In this manner, in each case the particular pressing force that is required in the edge region of the workpiece can be achieved, e.g. adjustingly or controlledly set and reacted to, for achieving an optimum adhesive bonding particularly in the region of the folded-back rim, respectively depending on the particular type of adhesive being used.

As mentioned above, in the open position of the apparatus, the protruding rim of the slider unit is positioned laterally beside or in front of the outer edge of the workpiece receiver i.e. lower mold tool. In this position, a free end of the protruding rim of the slider unit that faces toward the edge of the workpiece preferably is spaced from the edge of the workpiece, or alternatively from the outer edge of the workpiece receiver, by a spacing distance that essentially corresponds to the material thickness of the cover layer. Thereby, when the workpiece is moved downwardly relative to the slider unit (or the slider unit is moved upwardly relative to the workpiece), to fold-back the protruding margin or rim of the cover layer around the edge rim of the substrate, it is ensured that this margin portion of the cover layer is folded-back, laminated and smoothed around the edge rim of the substrate in the most form-fitting manner possible, especially also free of folds or wrinkles.

In a further preferred embodiment feature, the apparatus additionally includes a mold locking device by which the lower platen and the upper stroke platen are locked or fixed relative to one another at least in the stroke direction, in the closed position of the platens. This measure further helps to ensure that a defined pressing force is produced and applied by the at least one pressure actuator, especially in the region of the folded-back rim in the closed position of the apparatus.

The upper mold tool preferably has a recess along its outer edge facing toward the slider unit, wherein the recess is open toward this outer edge and toward the workpiece receiver. In the closed position of the lower platen and the upper stroke platen, the protruding rim of the slider unit is received in this recess of the upper mold tool. Further particularly, the recess preferably has a contact surface extending perpendicularly to the stroke direction, and an upper contact surface of the protruding rim of the slider unit contacts or stops against the contact surface of the recess when the platens are in the closed position and the slider unit is in the active position. This provides a positive position-fixing of the slider unit and the upper mold tool relative to each other in the stroke direction.

On the other hand, in the open position of the platens and retracted position of the slider unit, the upper contact surface of the protruding rim of the slider unit forms a supporting surface for the protruding margin of the cover layer. In this position, the upper contact surface of the slider unit is arranged coplanar or flush with a workpiece receiving surface of the workpiece receiver, so as to form a planar supporting surface for the workpiece including the laterally protruding margin of the cover layer.

The workpiece receiver may be constructed as one piece or as plural separately movable pieces. Particularly preferably, the workpiece receiver comprises at least one first part and at least one second part that are movable relative to one another. Particularly, the workpiece receiver may comprise at least one main pressing tool and one or more partial supports that form the support surface for the workpiece in the open position of the apparatus. The one or more partial supports are preferably spring-supported and spring-biased toward a position in which an upper workpiece receiving surface of the partial supports is flush and coplanar with the upper surface of the protruding rim of the slider unit. Thereby in the open position of the apparatus, the upper surface of the protruding rim of the slider unit forms a supporting surface for the protruding margin of the cover layer, and this upper surface of the slider unit is flush and coplanar with the workpiece receiving surface of the workpiece receiver. Together these surfaces thus form a flush coplanar support surface for the workpiece including its laterally protruding cover layer rim or margin.

Furthermore, the at least one main pressing tool of the workpiece receiver is separately actively movable in the stroke direction by actuation of the at least one pressure actuator, to apply the additional pressing force onto the workpiece and particularly the workpiece rim as discussed above. In an embodiment with plural main pressing tools, they are independently driven respectively by plural pressure actuators. Thereby, different pressing force magnitudes can be applied at different areas of the workpiece. For example, plural independent main pressing tools are provided respectively along different portions of a perimeter of the workpiece, so that different pressing force magnitudes can be applied at different portions of the edge rim of the workpiece, for example depending on different configurations or dimensions of the folded-back rim at the different portions of the perimeter of the workpiece. In this manner, it is possible to apply the particular pressing force that is required at each particular location of the folded-back rim to achieve a reliable adhesion of the folded-back rim at each respective location along the perimeter of the workpiece. The pressing force applied respectively by each pressure actuator is controlled appropriately to achieve the respective locally required pressing force.

The slider unit is preferably immovable in the stroke direction, in that it is mounted and fixed, with respect to the stroke direction, on the lower platen. Furthermore, the slider unit is movable in a sliding direction transverse or especially perpendicular to the stroke direction, and thus preferably parallel to the workpiece receiving surface of the workpiece receiver, by means of a linear positioning drive secured to the lower platen. The linear drive is especially configured and controlled to drive the slider unit in its sliding direction, by a continuous or quasi-continuous linear motion from an initial starting position of the slider unit to an end position of the slider unit, during the movement of the upper stroke platen from the open position to the closed position relative to the lower platen. The initial starting position is the retracted position in which the slider unit is positioned laterally in front of or beside the workpiece receiver, and the end position is the active position in which the slider unit protrudes over the workpiece receiver as discussed above.

In another embodiment, the apparatus includes a plurality of the slider units at respective portions around the perimeter of the workpiece. Thereby a continuous folded-back edge can be produced around the complete perimeter of the workpiece, regardless of the complexity of the configuration of the perimeter. The sliding direction of a respective slider unit is preferably substantially perpendicular to the perimeter of the workpiece at that respective location.

The apparatus preferably still further comprises a radiant heat source or heater, for example an infrared thermal radiator, which is preferably mounted on the upper stroke platen and oriented to direct its emitted radiant heat onto the upper surface of the protruding rim of the slider unit, which forms a support and contact surface for the protruding margin of the cover layer of the workpiece, as described above. The radiant heater thus applies heat especially to the protruding margin of the cover layer, and optionally to the edge rim portion of the substrate, to ensure that this portion of the cover layer is effectively and smoothly folded-back around the edge rim of the substrate and laminated and adhesively bonded around the edge and onto the back surface of the edge rim of the substrate. Also, the infrared heating serves to activate an adhesive that may be used for adhesively bonding the folded-back rim portion of the cover layer onto the substrate. Alternatively, if the cover layer itself includes a suitable heat-activatable material that will bond onto the substrate, for example a thermoplastic material of the cover layer that can bond with a thermoplastic material of the substrate, then the additional adhesive can be omitted, and the lamination and bonding is achieved simply by the heating of the cover layer material followed by pressing thereof onto the (preferably also pre-heated) material of the substrate.

The above objects can also be achieved according to another embodiment of the invention that provides a method for folding back a protruding margin or rim of a cover layer around an edge rim of a substrate to form a laminated component with a folded-back rim. Such a method is carried out, for example, using an apparatus according to the invention. In this regard, the method according to an embodiment of the invention comprises the following steps. A workpiece that includes a cover layer and a substrate is laid onto the workpiece receiver of the apparatus, with the cover layer facing toward the workpiece receiver. The cover layer may have been pre-laminated onto the substrate in a previous procedure. Alternatively, the cover layer may initially be loose and separate from the substrate, but the cover layer becomes laminated and bonded onto the substrate in the present method. The cover layer includes a protruding margin that protrudes outwardly beyond an edge rim of the substrate. This protruding margin of the cover layer is arranged to lie in contact on and be supported by the upper contact surface of the protruding rim of the slider unit of the apparatus. In a next step, the upper stroke platen is moved from the open position to the closed position, whereby the workpiece receiver moves toward the lower platen at least by the amount of a thickness dimension of the workpiece in the stroke direction. During this movement of the upper stroke platen, or coordinated therewith and following thereafter, the slider unit is moved by a linear motion from its initial starting position (i.e. the retracted position) in which the slider unit is positioned laterally in front of or beside the workpiece receiver, to an end position (i.e. the active position) in which the slider unit protrudes over an outer edge of the workpiece receiver. Thereafter, in a further step, a pressing force is applied to the workpiece receiver relative the lower platen, so that the workpiece receiver and therewith the workpiece is pressed against the upper mold tool and against the protruding rim portion of the slider unit. Thereby the protruding margin of the cover layer is folded-back and bonded around an edge and onto a back surface of the edge rim of the substrate, to form the folded-back laminated rim of the workpiece.

In a preferred but optional further step, the upper stroke platen and the lower platen are locked or fixed relative to one another in the stroke direction, after the upper stroke table has been moved to the closed position but before the pressing force is applied to the workpiece receiver relative to the lower platen.

In another optional but preferred step, before and/or during the movement of the upper stroke platen from the open position to the closed position, the edge rim portion of the substrate and the protruding margin of the cover layer are heated, preferably by impinging thermal radiation thereon.

BRIEF DESCRIPTION OF THE DRAWINGS

In order that the invention may be clearly understood, it will now be explained in further detail in connection with example embodiments thereof, with reference to the accompanying drawings, wherein.

DETAILED DESCRIPTION OF EXAMPLE EMBODIMENTS OF THE INVENTION

Figure 1:
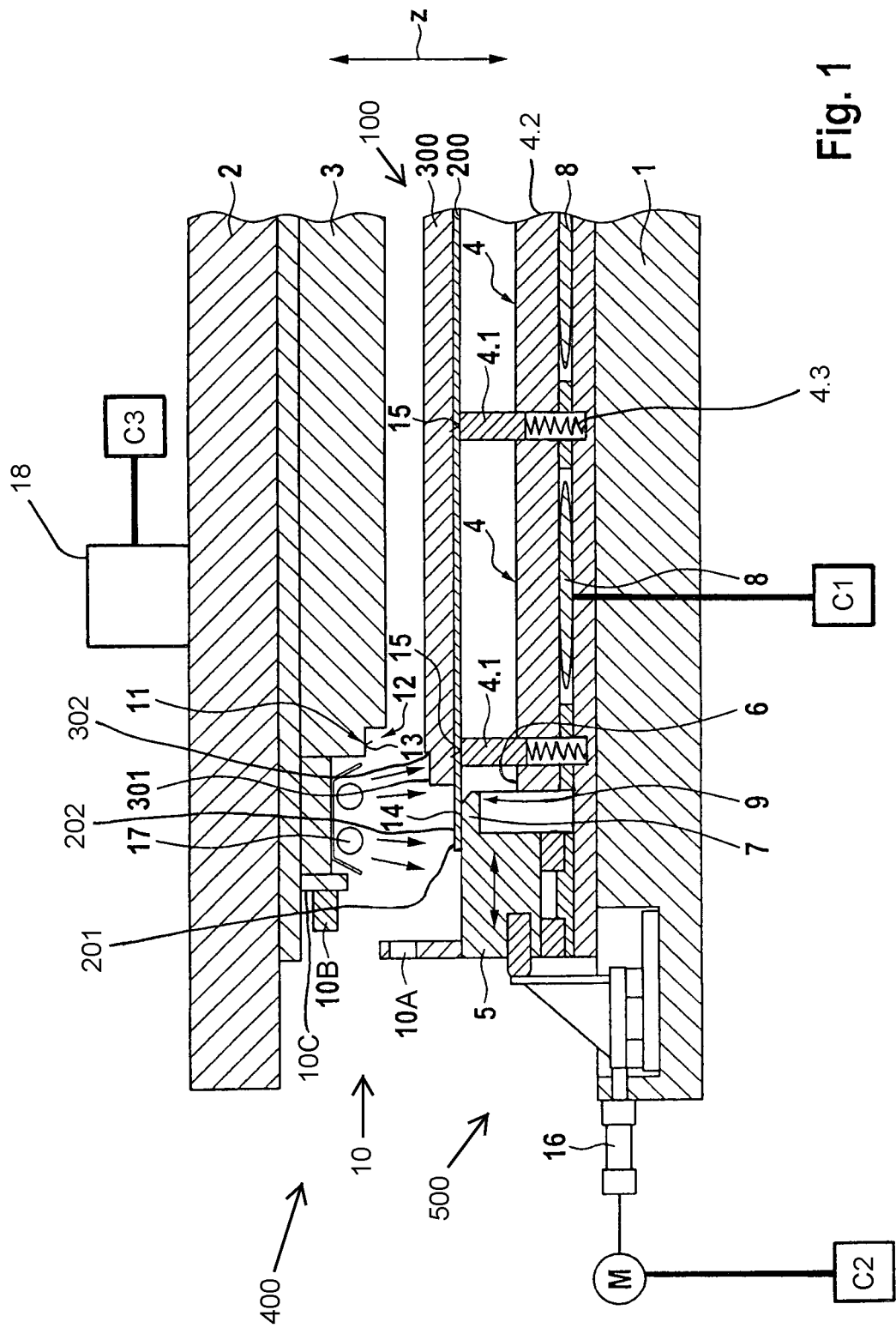
FIG. 1 is a schematic cross-sectional view of an inventive embodiment of an apparatus in its open position.
Figure 2:
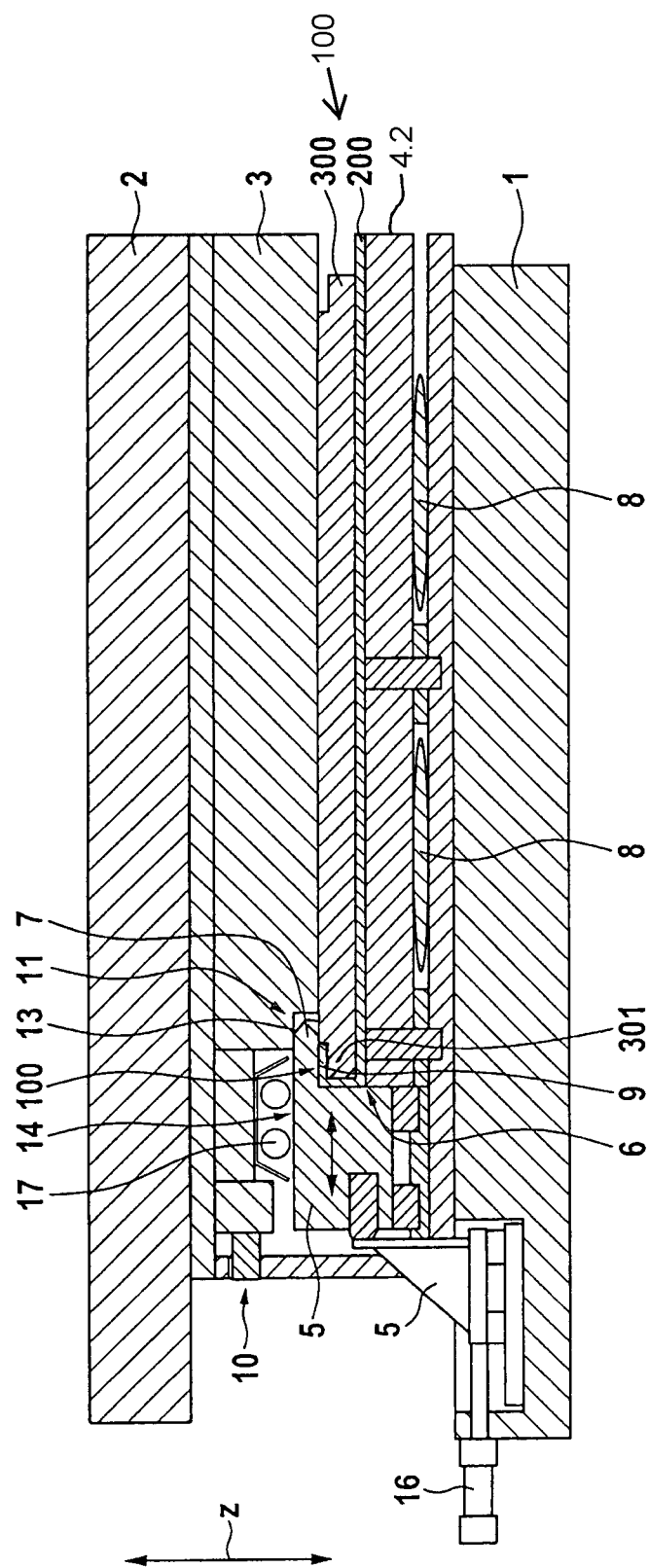
FIG. 2 is a schematic cross-sectional view of the inventive embodiment of the apparatus according to FIG. 1, but here shown in its closed position.

FIGS. 1 and 2 schematically illustrate an apparatus 400 for forming a laminated and molded workpiece 100 having a folded-back rim. The workpiece 100 includes a substrate 300 and a cover layer 200 laminated onto the substrate 300. A protruding margin or rim 201 of the cover layer 200 protrudes beyond an edge rim 301 of the substrate 300 in an initial starting condition as shown in FIG. 1. The folded-back rim of the finished workpiece 100 is formed by folding back and laminating the protruding margin 201 of the cover layer 200 around the edge rim 301 and onto the back surface of the substrate 300. In the illustrated example embodiment, the workpiece 100 is substantially flat and planar. However, in other embodiments, the workpiece 100 may have a two-dimensionally or three-dimensionally molded contoured configuration that is established prior to or during the method carried out with the apparatus 400, which is suitably adapted to the configuration of the workpiece to be produced.

The apparatus 400 comprises a lower press platen 1 and an upper press platen 2, which are linearly movable relative to one another in the stroke direction Z illustrated by a double-headed arrow in FIGS. 1 and 2. FIG. 1 illustrates the open position, and FIG. 2 illustrates the closed position of the two platens 1 and 2 relative to one another. It is simply necessary that the platens 1 and 2 are movable relative to one another, whereby either one or both of the platens 1 and 2 may be movable relative to a machine frame (not shown) of the apparatus. In the illustrated embodiment, the lower platen 1 remains stationary while the upper platen 2 is called the stroke platen because it is driven in the stroke direction Z relative to the lower platen 1. Alternatively, this arrangement could be configured "upside down" or with both of the platens being movable. The actuator 18 for moving the stroke platen 2 relative to the lower platen 1 is illustrated merely schematically, but can have any conventionally known structure and arrangement, for example a pneumatic or hydraulic piston-cylinder device, or an electric motor drive cooperating with any suitable transmission mechanism for converting the rotational movement of the drive motor to a linear movement in the stroke direction Z, for example via an acme screw or a gear train with a lever drive.

The apparatus 400 further comprises an upper mold tool or pressing tool 3 mounted on the upper stroke platen 2, and a lower mold tool, pressing tool or workpiece receiver 4 mounted on the lower platen 1. These tools 3 and 4 receive the workpiece materials therebetween, and serve to press and (optionally) laminate and (optionally) two- or three-dimensionally mold the workpiece materials therebetween. In the illustrated embodiment, the tools 3 and 4 each have a simple planar pressing or molding surface, but in other embodiments, the tools may have any surface contour suited to molding the required configuration of the workpiece to be produced. The starting material of the workpiece 100 is laid into the open apparatus 400 as shown in FIG. 1, so that the workpiece 100 rests with the cover layer 200 thereof on a workpiece receiving surface 15 of the lower tool i.e. workpiece receiver 4, and the back surface of the substrate 300 (opposite the cover layer 200) faces upward toward the upper mold tool 3. Thus, when the apparatus is closed, as shown in FIG. 2, a pressing or molding surface of the upper mold tool 3 contacts and presses against the back surface of the substrate 300.

As a special feature according to the invention, the apparatus 400 further comprises an edge-folding device 500, which includes at least one slider unit 5 that is movable in a sliding direction transverse and preferably perpendicular to the stroke direction Z between a retracted position shown in FIG. 1 and an active position shown in FIG. 2. In the active position, at least a protruding portion of the slider unit 5 slightly protrudes over an outer edge 6 of the workpiece receiver 4, with respect to the workpiece receiver's motion in the stroke direction Z. In comparison, in the retracted position the slider unit 5 is positioned laterally clear of, e.g. in front of or beside the outer edge 6 of the workpiece receiver 4, and thus does not overlap or protrude over the workpiece receiver 4. The apparatus may comprise plural slider units 5 arranged adjacent one another continuously around a perimeter of the workpiece, or at least along any edge of the workpiece that is to be provided with a folded-back rim.

In the illustrated embodiment, the lower mold tool or workpiece receiver 4 comprises plural partial supports 4.1 set into a main pressing tool 4.2. The partial supports 4.1 are each respectively spring-supported by a spring 4.3 relative to the lower platen 1, so that they move in a spring-biased manner in the stroke direction Z relative to the lower platen 1 and relative to the main pressing tool 4.2. Furthermore, the main pressing tool 4.2 is supported by pressure actuators 8 relative to the lower platen 1, so that the main pressing tool 4.2 can be actively driven in the stroke direction Z relative to the lower platen 1, for applying a pressing force or laminating and molding pressure onto the workpiece 100 as will be described below.

In the open position of the apparatus shown in FIG. 1, the upper surfaces of the spring-supported partial supports 4.1 form a workpiece receiving surface 15 on which the workpiece 100 (via its cover layer 200), is supported. While FIG. 1 illustrates the main pressing tool 4.2 retracted to a downward position with retracted pressure actuators 8, the main pressing tool 4.2 may alternatively be raised by actuation of the pressure actuators 8 to bring the upper surface of the main pressing tool 4.2 into flush alignment with the workpiece receiving surface 15 formed by the upper surfaces of the partial supports 4.1, to form a continuous planar workpiece receiving surface 15. In the present example embodiment, the substrate has been pre-pressed and already has some form-stability, and the cover layer 200 has been pre-laminated onto the substrate 300, in a separate process before the workpiece 100 is placed into the apparatus 400 as shown in FIG. 1. In such an embodiment, the partial supports 4.1 form a sufficient partial workpiece receiving surface 15 to support the workpiece 100, because there is no risk of the already-laminated cover layer 200 sagging down between the individual partial supports 4.1. In other embodiments with the cover layer 200 not yet laminated onto the substrate 300, the main pressing tool 4.2 may be driven upward into flush planar alignment with the upper surface of the partial supports 4.1 to form the continuous workpiece receiving surface 15 on the partial supports 4.1 as well as the main pressing tool 4.2. In such a case, the main pressing tool 4.2 should be allowed to yield downwardly along with the partial supports 4.1 when the apparatus transitions to the closed position shown in FIG. 2.

FIG. 1 shows only a single main pressing tool 4.2. In another embodiment, however, the lower tool or workpiece receiver 4 comprises plural main pressing tools 4.2 that are respectively independently actively driven by respective pressure actuators 8, for example to achieve special molded configurations at individual areas of the workpiece, or to apply different magnitudes of the pressing force as required individually at different portions of the folded-back edge rim of the workpiece. Preferably, the main pressing tool integrally or monolithically includes the outer edge portion of the lower mold tool or workpiece receiver that will press the edge rim portion of the workpiece as described herein. Thereby, an increased pressing force can be applied especially to the edge rim portion of the workpiece. This increased pressing force is applied by the pressure actuators 8, and can especially be greater than the spring force of the springs 4.3, and greater than the press closing force applied by the press actuator 18. In an embodiment with plural main pressing tools 4.2 independently driven by plural pressure actuators 8, different magnitudes of pressing force may be applied respectively as required at different portions of the edge rim of the workpiece. Preferably, the pressing force is adjusted and controlled independently for the several main pressing tools, depending on the locally required force for achieving a good bonding of the folded-back margin of the cover layer around and onto the back surface of the edge rim of the substrate at the respective location, depending on the adhesive being used (if any) or the local bonding characteristics of the materials of the workpiece, the configuration of the folded-back edge rim at the respective location, etc. In a further alternative embodiment, the workpiece receiver is a one-piece pressing or mold tool without separate partial supports 4.1. In such an embodiment, the single one-piece mold tool may be spring-supported for initially yielding in a spring-biased manner in the stroke direction Z when the stroke platen is driven to the closed position, and actively driven by pressure actuators 8 to apply an increased pressing force on the workpiece after the apparatus has reached the closed position.

In the open position shown in FIG. 1, the slider unit 5 and the partial supports 4.1 are positioned and arranged relative to one another so that an upper contact surface 14 of the slider unit 5 aligns flush on the same plane as the workpiece receiving surface 15 formed by the partial supports 4.1, so as to thereby form a single planar contact surface for supporting the protruding margin portion of the cover layer 200 on the upper contact surface 14 of the slider unit 5 and supporting the main body portion of the cover layer 200 and therewith the workpiece 100 on the workpiece receiving surface 15 of the partial supports 4.1. The drawings also show that during the transition of the apparatus from the open position shown in FIG. 1 to the closed position shown in FIG. 2, the partial supports 4.1 are pushed downwardly against the spring bias of the springs 4.3 in the direction toward the lower platen 1, until they reach the position shown in FIG. 2. In this position, the respective upper surface of each partial support 4.1 forming the workpiece receiving surface 15 is flush and coplanar with the remaining surface portions of the main pressing tool 4.2 of the workpiece receiver 4 and thereby form a flush planar contact and support surface for supporting the workpiece 100 including the cover layer 200 on the substrate 300.

The slider unit 5 includes a main slider body and a protruding rim 7 that protrudes laterally (toward the right in the Figures) from the main slider body. In the retracted position of the slider unit 5 as shown in FIG. 1, the free end of the protruding rim 7 of the slider unit 5 is spaced laterally in front of or beside the edge rim 301 of the substrate 300, whereby a spacing distance from the free end of the protruding rim 7 of the slider unit 5 to the outer edge of the edge rim 301 of the substrate 300 essentially corresponds to the material thickness of the cover layer 200. In this embodiment, "essentially corresponds" means especially e.g. within +/−10%, or corresponding sufficiently to achieve the result of a close, smooth wrinkle-free lamination of the cover layer margin portion around the edge rim of the substrate, as follows. When the apparatus transitions from the open position shown in FIG. 1 to the closed position shown in FIG. 2 by moving the upper stroke platen 2 and the associated upper mold tool 3 downwardly in the stroke direction Z, thereby the protruding margin or rim portion 201 of the cover layer 200 will slide off the upper contact surface 14 of the slider unit 5 and be pulled through the spacing gap between the free end of the protruding rim 7 of the slider unit 5 and the outer edge of the edge rim 301 of the substrate 300. Because that spacing gap has essentially the same dimension as the thickness of the cover layer 200, it is ensured that the cover layer is closely and tightly brought into contact with the edge rim 301 of the substrate 300, and thereby laminated in a smooth, close-fitting and fold-free or crease-free manner onto the edge rim 301 of the substrate 300. To assist in this process the upper edge of the protruding rim 7 of the slider unit 5, where the upper contact surface 14 adjoins the free end of the protruding rim 7, may be chamfered, beveled or rounded to ensure that the protruding margin 201 of the cover layer 200 is smoothly pulled from the upper contact surface 14 and laminated by the free end of the protruding rim 7 of the slider unit 5 onto the outer edge of the edge rim 301 of the substrate 300. Then, as the slider unit 5 moves from its retracted position to its active position, as will be described further below, the slider unit's protruding rim 7 folds-back and laminates the protruding margin 201 of the cover layer around and onto the back surface of the edge rim 301 of the substrate.

A radiant heat source 17 such as an infrared IR radiant heater is arranged on the upper stroke platen 2 laterally next to the upper mold tool 3, and faces downwardly to direct radiant heat onto the edge rim 301 of the substrate 300 and the protruding margin 201 of the cover layer 200. Thereby, an adhesive 202 that was previously applied on the upper or inner surface of the cover layer 200, and/or the material of the cover layer 200 itself, as well as the material of the edge rim 301 of the substrate 300, are heated and thermally activated to achieve the required adhesive bonding for the lamination of the folded-back rim.

After the upper stroke platen 2 and the associated upper mold tool 3 have moved downwardly in the stroke direction Z to transition from the open position shown in FIG. 1 to the closed position shown in FIG. 2, the slider unit 5 is driven toward the right in a sliding direction that is preferably perpendicular to the stroke direction Z, from the retracted position shown in FIG. 1 to the active position shown in FIG. 2. This sliding motion of the slider unit 5 is driven by a linear positioning drive 16 powered by an electric motor M in the illustrated embodiment. However, the linear positioning drive 16 is not limited to any particular embodiment or configuration, and can alternatively be a hydraulically or pneumatically driven linear positioning drive. This motion of the slider unit 5 from the retracted position to the active position continues the process of folding and bonding the protruding margin 201 of the cover layer 200 around and onto the back surface of the edge rim 301 of the substrate 300.

Further in this regard, the upper mold tool 3 has a recess 12 at an outer edge 11 of the mold tool 3 facing toward the slider unit 5. This recess 12 is open facing toward this outer edge 11 and toward the workpiece receiver 4. In the closed position of the lower platen 1 and the upper stroke platen 2 and the active position of the slider unit 5 as shown in FIG. 2, the protruding rim 7 of the slider unit 5 is received in the recess 12 of the upper mold tool 3. The upper contact surface 14 of the protruding rim 7 of the slider unit 5 contacts and braces against a downwardly facing contact surface 13 of the recess 12 in the upper mold tool 3. Thereby, the slider unit 5 is firmly braced against the upper mold tool 3 and upper stroke platen 2 in the stroke direction Z.

Furthermore, the apparatus 400 preferably additionally comprises a mold locking device 10 including a locking pin 10B and a locking receiver 10A with a hole to receive the pin 10B. The locking receiver 10A is fixedly mounted with respect to the lower platen 1. The locking pin 10B is connected to a locking actuator 10C that is fixedly mounted with respect to the upper stroke platen 2. After the upper stroke platen 2 and associated upper mold tool 3 have been moved to the closed position as shown in FIG. 2, the locking actuator 10C is actuated to move the locking pin 10B in a direction perpendicular to the stroke direction Z, so that the locking pin 10B engages into the hole of the locking receiver 10A. Thereby, a rigid mechanical locking connection is established between the lower platen 1 and the upper stroke platen 2 through the actuated mold locking device 10, to prevent further relative motion between the two platens 1 and 2 at least in the stroke direction Z.

At this time, with the mold locking device 10 actuated, then the pressure actuators 8 between the lower platen 1 and the main pressing tool 4.2 of the workpiece receiver 4 are actuated, e.g. pneumatically, so as to apply a defined pressing force via the main pressing tool 4.2 onto the workpiece 100, especially for pressing and laminating the cover layer 200 onto the substrate 300, particularly also along the edge rim 301 of the substrate 300. Namely, in the illustrated closed position of FIG. 2, the actuated pressure actuators 8 apply an effective mechanical force or pressure to the main pressing tool 4.2 of the workpiece receiver 4 so as to press the main pressing tool 4.2 upwardly in the stroke direction Z toward the upper mold tool 3, so that the cover layer 200 is pressed and laminated tightly onto the substrate 300 between the workpiece receiver 4 and the upper mold tool 3, and in the area of the edge rim 301 of the substrate 300 a corresponding outer edge portion 6 of the main pressing tool 4.2 presses upwardly against the lower pressing surface 9 of the protruding rim 7 of the slider unit 5. Particularly in the area of the edge rim 301 of the substrate 300, the lower pressing surface 9 of the protruding rim 7 of the slider unit 5 forms a counter surface against which the edge rim 301 is pressed by the outer edge portion 6 of the main pressing tool 4.2 of the workpiece receiver 4 driven by the pressure actuators 8.

At this stage, as described above, the upper contact surface 14 of the protruding rim 7 of the slider unit 5 contacts and braces against the downwardly facing contact surface 13 in the recess 12 of the upper mold tool 3. Also, the slider unit 5 is mounted on the lower platen 1 in a manner that permits its sliding motion perpendicular to the stroke direction Z, but does not permit relative motion in the stroke direction Z. Furthermore, the actuated mold locking device 10 fixes or locks together the lower platen 1, the upper stroke platen 2, the upper mold tool 3 as well as the slider unit 5 so as to prevent relative motion thereof in the stroke direction Z. Due to this fixing of the several components in the stroke direction Z, the pressing force applied by the pressure actuators 8 is a positive, defined, controlled force, which may be greater than the mold-closing force applied by the actuator 18 and greater than the spring force applied by the springs 4.3, and is thus particularly effective for pressing and laminating the cover layer 200 onto the substrate 300, especially also including pressing of the protruding margin 201 of the cover layer 200 onto the bottom surface and the top surface of the edge rim portion 301 of the substrate 3. Furthermore, the sliding motion of the slider unit 5 in the direction perpendicular to the stroke direction Z, particularly perpendicularly toward the outer edge of the edge rim 301 of the substrate 300, additionally applies a pressing force of the slider unit 5 (perpendicular to the stroke direction Z) onto the folded-back margin portion 201 of the cover layer 200 onto the outer perimeter of the edge rim portion 301 of the substrate 300. Thereby, the margin portion 201 of the cover layer 200 is tightly folded-back and around the edge rim 301 of the substrate 300, and from all three directions, i.e. onto all three surfaces of the edge rim portion 301, the cover layer is tightly pressed, laminated and adhered onto the edge rim portion of the substrate 300. This ensures a tight, fold-free, crease-free, smooth, reliable and durable lamination and bonding of the folded-back cover layer around and onto the front surface, the outer perimeter edge, and the back surface of the edge rim portion 301 of the substrate 300.

The pressure actuator 8 may be e.g. a pneumatic pressure cushion such as an inflatable air bag or pressure hose. The actuation of the pressure actuator 8 is controlled by a controller C1. The actuation of the linear positioning drive 16 is controlled by a controller C2. The actuation of the mold closing actuator 18 is controlled by a controller C3. The controllers C1, C2 and C3 may be separate controller units that are connected and coordinated with one another in order to coordinate the motions of the stroke platen 2, the workpiece support 4 and the slider unit 5. Alternatively, the controllers C1, C2 and C3 may be integrated with one another in a single control unit in a machine control console. The controllers may comprise one or more electronic circuits with one or more analog and/or digital electronic circuit elements and/or one or more processors configured to carry out the method sequences as described herein by open-loop control and/or closed-loop regulation. Various peripheral devices for control input by operating personnel and output to operating personnel, as well as various sensors for sensing positions, forces, pressures, etc., and timing devices for measuring and controlling timed steps and sequences, are provided as auxiliary devices for the controllers as is generally understood in the art. Such auxiliary devices are thus not shown in the drawings.

Although the invention has been described with reference to preferred example embodiments, it will be appreciated that it is intended to cover all modifications and equivalents within the scope of the appended claims. It should also be understood that the present disclosure includes all possible combinations of any individual features described herein and/or recited in any of the appended claims. The abstract of the disclosure does not define or limit the claimed invention, but rather merely abstracts certain features disclosed in the application.

What is claimed is:

1. An apparatus for folding-back and bonding a margin portion of a cover layer around an edge rim of a substrate of a workpiece that includes the substrate and the cover layer, wherein said apparatus comprises:
   a first platen and a second platen that are relatively movable relative to one another linearly in a stroke direction between an open position in which said first and second platens are farthest apart from one another and a closed position in which said first and second platens are closest to one another;
   a first pressing tool arranged on said first platen;
   a second pressing tool arranged on said second platen, facing toward said first pressing tool on said first platen; and
   an edge-folding device comprising a slider unit that is movable in a sliding direction transverse to the stroke direction between a retracted position and an active position, wherein in the active position at least a protruding portion of said slider unit protrudes over an outer edge portion of said first pressing tool, and in the retracted position said slider unit is retracted clear of said outer edge portion of said first pressing tool; and
   said apparatus further has at least one of the following two features:
   a first feature wherein said protruding portion comprises a protruding rim of said slider unit that protrudes over said outer edge portion of said first pressing tool when said slider unit is in the active position, and wherein said second pressing tool contacts said protruding rim of said slider unit and said protruding rim is received between said first and second pressing tools when said first and second platens are in the closed position and said slider unit is in the active position, and/or
   a second feature wherein said second pressing tool, at an outer edge thereof facing toward said slider unit, has a recess that is open toward said first pressing tool and toward said slider unit, wherein said protruding portion comprises a protruding rim of said slider unit that protrudes between said first and second pressing tools when said slider unit is in the active position, and wherein said protruding rim is received in said recess when said first and second platens are in the closed position and said slider unit is in the active position.

2. The apparatus according to claim 1, wherein said first platen is stationary, said first pressing tool is linearly movable in the stroke direction relative to said first platen, and at least a first portion of said first pressing tool is spring-supported in the stroke direction by at least one spring relative to said first platen.

3. The apparatus according to claim 2, wherein said first portion of said first pressing tool comprises plural independent spring-biased partial supports, and said at least one spring comprises plural springs that respectively independently spring-support and spring-bias said partial supports relative to said first platen in the stroke direction.

4. The apparatus according to claim 2, wherein said first pressing tool further comprises a second portion that comprises a main pressing tool which integrally includes said outer edge portion of said first pressing tool, and wherein said apparatus further comprises at least one active pressure actuator that is operatively arranged between said first platen and said main pressing tool and that is configured to apply a pressing force to said main pressing tool relative to said first platen in the stroke direction toward said second pressing tool, so as to actively press the workpiece between said main pressing tool and said second pressing tool and between said edge portion of said main pressing tool and a counter-surface of said protruding portion of said slider unit when said first and second platens are in the closed position and said slider unit is in the active position.

5. The apparatus according to claim 1, wherein said first pressing tool comprises a main pressing tool which integrally includes said outer edge portion of said first pressing tool, and wherein said apparatus further comprises at least one active pressure actuator that is operatively arranged between said first platen and said main pressing tool and that is configured to apply a pressing force to said main pressing tool relative to said first platen in the stroke direction toward said second pressing tool, so as to actively press the workpiece between said main pressing tool and said second pressing tool and between said edge portion of said main pressing tool and a counter-surface of said protruding portion of said slider unit when said first and second platens are in the closed position and said slider unit is in the active position.

6. The apparatus according to claim 5, wherein said active pressure actuator comprises an electric motor driven actuator, a hydraulic actuator, a pneumatic actuator, or a pneumatic pressure cushion.

7. The apparatus according to claim 6, further comprising a controller connected to said active pressure actuator and configured to control said active pressure actuator so as to press the workpiece with a pre-defined pressing force between said main pressing tool and said second pressing tool.

8. The apparatus according to claim 1, further comprising a mold locking device connected to said first and second platens and configured to selectively fix said first and second platens relative to one another in the stroke direction when said first and second platens are in the closed position.

9. The apparatus according to claim 1, wherein said apparatus has said first feature.

10. The apparatus according to claim 1, wherein said apparatus has said second feature.

11. The apparatus according to claim 10, wherein said recess is bounded by a contact surface of said second pressing tool that extends perpendicularly to the stroke direction, and wherein said contact surface contacts an upper surface of said protruding rim when said first and second platens are in the closed position and said slider unit is in the active position.

12. The apparatus according to claim 1, wherein, when said slider unit is in the retracted position, a free end of said protruding rim is spaced away from the edge rim of the substrate of the workpiece by a spacing distance that essentially corresponds to a material thickness of the cover layer of the workpiece.

13. The apparatus according to claim 1, wherein said protruding rim of said slider unit is bounded by an upper surface and a free end, and wherein a junction of said upper surface and said free end is beveled, chamfered or rounded.

14. The apparatus according to claim 1, wherein, when said slider unit is in the retracted position and said first and second platens are in the open position, a first upper surface of said slider unit is aligned coplanar with a second upper surface of said first pressing tool so that said first and second upper surfaces together form a support surface for the workpiece.

15. The apparatus according to claim 14, wherein said slider unit is immovable in the stroke direction, and wherein said edge-folding device further comprises a linear positioning drive that is mounted on said first platen and operatively connected to said slider unit so as to move said slider unit in said sliding direction which is parallel to said first and second upper surfaces.

16. The apparatus according to claim 15, wherein said linear positioning device is configured and adapted to move the slider unit in a continuous linear motion from the retracted position to the active position during and in coordination with a movement of said second platen relative to said first platen from the open position to the closed position.

17. The apparatus according to claim 1, further comprising a radiant heater mounted on said second platen and oriented to direct radiant heat toward the margin portion of the cover layer of the workpiece supported on the protruding portion of the slider unit.

18. A method of using the apparatus according to claim 1, comprising the steps:

a) laying the workpiece on said first pressing tool and said slider unit, with the cover layer resting on a workpiece receiving surface of said first pressing tool, and with the margin portion of the cover layer protruding beyond the edge rim of the substrate and resting on an upper contact surface of said protruding portion of said slider unit;

b) moving said second platen relatively toward said first platen in the stroke direction from the open position to the closed position, whereby said first pressing tool with the workpiece thereon is moved closer to said first platen by at least a thickness of the workpiece in the stroke direction;

c) during said step b), moving said slider unit by a linear movement in the sliding direction from the retracted position to the active position; and d) after said steps b) and c), applying an active pressing force to said first pressing tool relative to said first platen, so that said first pressing tool actively presses said workpiece against said second pressing tool.

19. The method according to claim 18, further comprising locking together said first and second platens in the stroke direction after said step b) and before said step d).

20. The method according to claim 18, further comprising heating the margin portion of the cover layer and the edge rim of the substrate before and optionally during said step b).

* * * * *